(12) United States Patent
Rowell

(10) Patent No.: US 12,717,574 B2
(45) Date of Patent: Aug. 25, 2026

(54) RAPID SOFTWARE PRODUCT VERSION DETECTION AND CERTIFICATION

(71) Applicant: Charter Communications Operating, LLC, St. Louis, MO (US)

(72) Inventor: Jeffrey Murray Rowell, Aurora, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 133 days.

(21) Appl. No.: 18/295,528

(22) Filed: Apr. 4, 2023

(65) Prior Publication Data

US 2024/0338208 A1 Oct. 10, 2024

(51) Int. Cl.
*G06F 8/71* (2018.01)
*G06F 8/65* (2018.01)

(52) U.S. Cl.
CPC . *G06F 8/71* (2013.01); *G06F 8/65* (2013.01)

(58) Field of Classification Search
None
See application file for complete search history.

(56) References Cited

U.S. PATENT DOCUMENTS 9,063,818 B1 * 6/2015 Risbood ................ G06N 20/00
2005/0166198 A1 * 7/2005 Gigliotti ................ G06F 21/57 717/172
2006/0026304 A1 * 2/2006 Price ........................ G06F 8/65 710/8
2006/0294511 A1 * 12/2006 Bartley .................... G06F 8/61 717/168
2009/0199293 A1 * 8/2009 Song .................... G06F 16/951 726/18
2015/0089292 A1 * 3/2015 Ueda .................. G06F 9/45558 714/33
2015/0324853 A1 * 11/2015 Damiano .......... G06Q 10/1093 705/7.19
2017/0277625 A1 * 9/2017 Shtuchkin .......... G06F 11/3688
2018/0159736 A1 * 6/2018 Prinsloo ............. H04L 41/0846
2020/0125352 A1 * 4/2020 Kannan .................... G06F 8/65
2021/0256135 A1 * 8/2021 Paluch ...................... G06F 8/71
2022/0091843 A1 * 3/2022 Chiu ........................ G06F 8/71

* cited by examiner

*Primary Examiner* — Andrew M. Lyons
(74) *Attorney, Agent, or Firm* — Dority & Manning, P.A.

(57) ABSTRACT

A verification computing system obtains from a vendor computing device software product version information that identifies a most recent version of a software product available from a software vendor. It is determined that an updated version of the first software product is available that has not been tested by the verification computing system. The verification computing system causes a generation of a first test computing environment that comprises one or more computing hosts or virtual machines. The updated version of the first software product using the first test computing environment is tested. The verification computing system generates information that indicates that the updated version of the first software product failed or passed a test threshold.

12 Claims, 6 Drawing Sheets

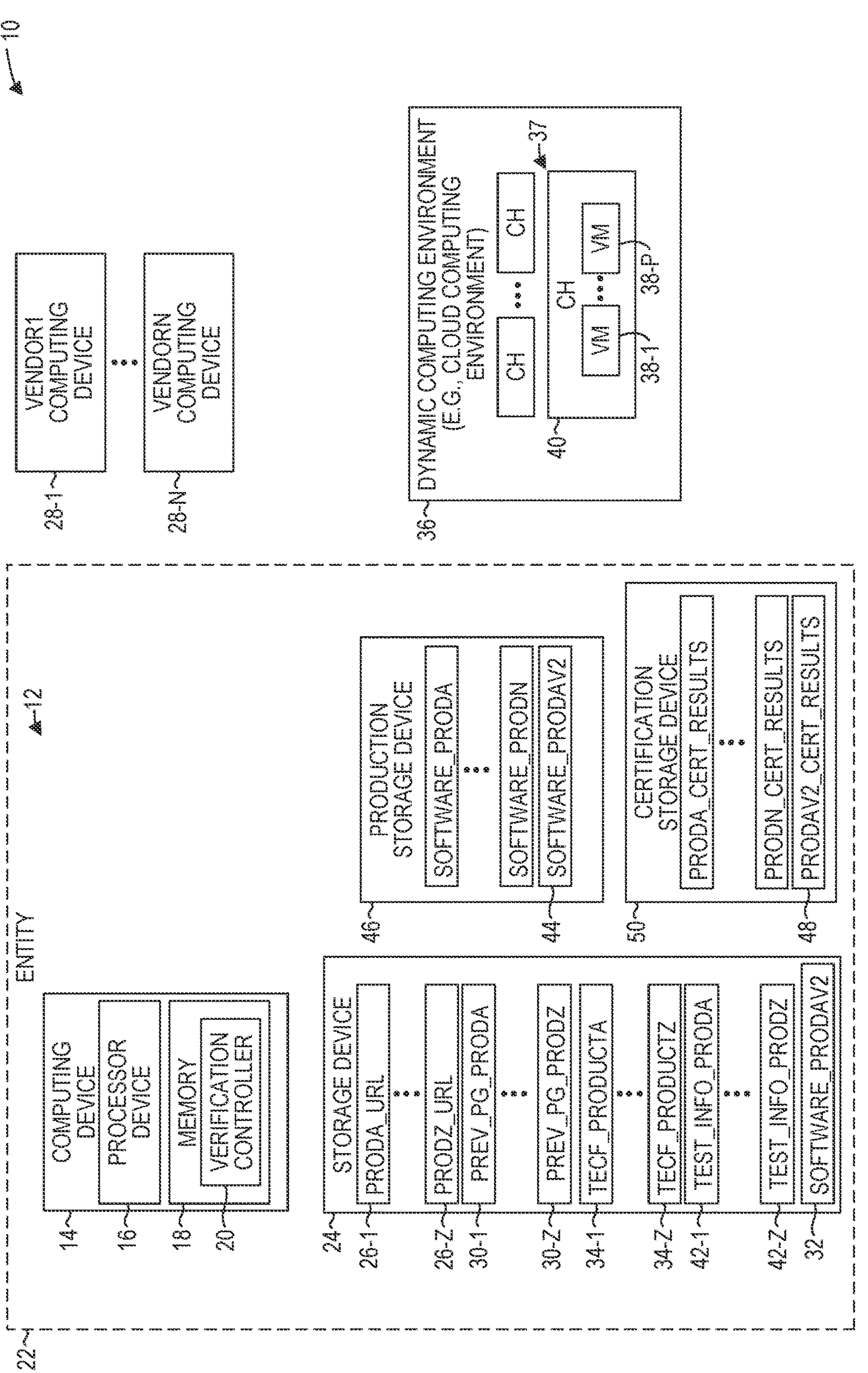
10
12
ENTITY
22
COMPUTING DEVICE
14
PROCESSOR DEVICE
16
MEMORY
18
VERIFICATION CONTROLLER
20
STORAGE DEVICE
24
PRODA_URL
26-1
PRODZ_URL
26-Z
PREV_PG_PRODA
30-1
PREV_PG_PRODZ
30-Z
TECF_PRODUCTA
34-1
TECF_PRODUCTZ
34-Z
TEST_INFO_PRODA
42-1
TEST_INFO_PRODZ
42-Z
SOFTWARE_PRODAV2
32
PRODUCTION STORAGE DEVICE
46
SOFTWARE_PRODA
SOFTWARE_PRODN
SOFTWARE_PRODAV2
44
CERTIFICATION STORAGE DEVICE
50
PRODA_CERT_RESULTS
PRODN_CERT_RESULTS
PRODAV2_CERT_RESULTS
48
VENDOR1 COMPUTING DEVICE
28-1
VENDORN COMPUTING DEVICE
28-N
DYNAMIC COMPUTING ENVIRONMENT (E.G., CLOUD COMPUTING ENVIRONMENT)
36
CH
CH
CH
37
40
VM
VM
38-1
38-P
FIG. 1

RAPID SOFTWARE PRODUCT VERSION DETECTION AND CERTIFICATION

BACKGROUND

Software vendors frequently update software products and typically make updated releases/versions available to their customers over the Internet or other network. In certain technology areas, such as security software products, such new versions may number in the hundreds, or even thousands, per year.

SUMMARY

The embodiments disclosed herein implement rapid software product version detection and certification.

In one embodiment a method is provided. The method includes obtaining, by a verification computing system from a first vendor computing device, software product version information that identifies a most recent version of a first software product available from a first software vendor of a plurality of different software vendors. The method further includes determining, by the verification computing system, that an updated version of the first software product is available that has not been tested by the verification computing system. The method further includes causing, by the verification computing system, a generation of a first test computing environment that comprises one or more computing hosts or virtual machines. The method further includes testing, by the verification computing system, the updated version of the first software product using the first test computing environment. The method further includes generating, by the verification computing system, information that indicates that the updated version of the first software product failed or passed a test threshold.

In another embodiment a computing system is provided. The computing system includes one or more computing devices configured to obtain, from a first vendor computing device, software product version information that identifies a most recent version of a first software product available from a first software vendor of a plurality of different software vendors. The one or more computing devices are further configured to determine that an updated version of the first software product is available that has not been tested by the verification computing system. The one or more computing devices are further configured to cause a generation of a first test computing environment that comprises one or more computing hosts or virtual machines. The one or more computing devices are further configured to test the updated version of the first software product using the first test computing environment. The one or more computing devices are further configured to generate information that indicates that the updated version of the first software product failed or passed a test threshold.

In another embodiment a non-transitory computer-readable storage medium is provided. The non-transitory computer-readable storage medium includes executable instructions configured to cause one or more processor devices to obtain, from a first vendor computing device, software product version information that identifies a most recent version of a first software product available from a first software vendor of a plurality of different software vendors. The instructions are further configured to cause the one or more processor devices to determine that an updated version of the first software product is available that has not been tested by the verification computing system. The instructions are further configured to cause the one or more processor devices to cause a generation of a first test computing environment that comprises one or more computing hosts or virtual machines. The instructions are further configured to cause the one or more processor devices to test the updated version of the first software product using the first test computing environment. The instructions are further configured to cause the one or more processor devices to generate information that indicates that the updated version of the first software product failed or passed a test threshold.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 1 is a block diagram of an environment suitable for implementing rapid software product version detection and certification according to one embodiment;

DETAILED DESCRIPTION

Figure 2:
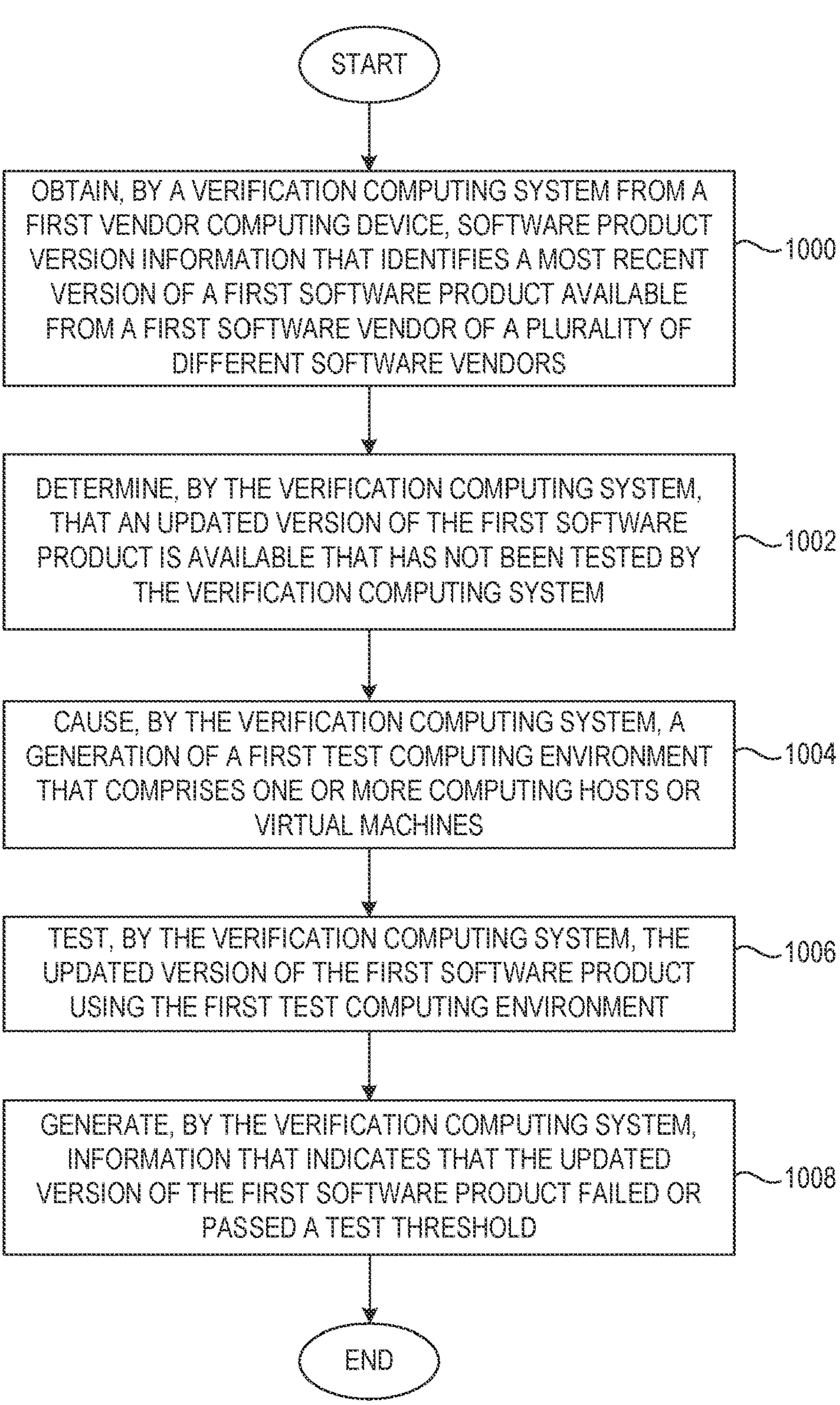
FIG. 2 is a flowchart of a method for implementing rapid software product version detection and certification according to one embodiment.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Software vendors frequently update software products and typically make updated releases/versions available to their customers over the Internet or other network. In certain technology areas, such as security software products, such new versions may number in the hundreds, or even thousands, per year.

Large entities that provide services to thousands or millions of customers, such as a national voice, data and video service provider, may utilize hundreds or thousands of different software products to service their customers. Each new software product release from a vendor must be tested to ensure that implementing the software product does not cause unintended consequences and result in customer dissatisfaction or other problems. On the other hand, especially where the software product relates to security of computing devices, networks, or other aspects of the service provider's infrastructure, it is desirable to identify, download and test such new releases as soon as possible to ensure that any vulnerabilities identified in a current version of the software product are rectified before a nefarious entity exploits the vulnerability and causes problems with the service provider's network.

There may be a delay between a software vendor making a new software product version available and a customer learning that the new software product version is available. It may then take additional time to set up the appropriate test environment needed to properly test the new software product version in order to certify that the new software product version may be safely implemented in a production environment. It may take additional time to test the new software product version and analyze the results to determine whether the new software product version passed or failed the certification requirements. In some environments, it is important to properly document exactly how the software product version was tested, including the testing input commands as well as the responses from the tested software product so that the test results can subsequently be analyzed if necessary.

The embodiments disclosed herein implement rapid software product version detection and certification. The embodiments obtain software product version information that identifies a most recent version of a software product available from a software vendor. If it is determined that the information indicates an updated version of a software product is available, the updated software product version is download. A test environment is automatically caused to be generated based on an implementation file that corresponds to the particular software product and the new software product version is automatically tested using test information that corresponds to the new software product version. It is then determined whether the new software product version passes the certification requirements. Documentation may be automatically generated that identifies the test inputs and the test results, or responses, from the new software product version.

The embodiments greatly reduce the timeframe ordinarily required to determine that a new software product version is available, testing the new software product version and ensuring that the new software product version can be safely implemented, and greatly reduces the need for rare and costly resources, such as software engineers, to do so.

FIG. 1 is a block diagram of an environment 10 suitable for implementing rapid software product version detection and certification according to one embodiment. The environment 10 includes a verification computing system 12 that comprises one or more computing devices 14. Each computing device 14 includes one or more processor devices 16 and a memory 18. In some embodiments, the functionality described herein may be implemented by a verification controller 20. It is noted however, that while the verification controller 20 is illustrated as a single component on a single computing device 14, in other embodiments the verification controller 20 may be implemented in a plurality of different components each of which may run on the same computing device 14 of the verification computing system 12 or may run on individual computing devices 14 of the verification computing system 12.

The verification computing system 12 may be owned or otherwise controlled by an entity 22 that utilizes a plurality of different software products obtained from a plurality of different software vendors. The term "software product" refers to a package of software that is provided to implement a certain functionality, such as a database functionality, a video streaming functionality, a cybersecurity functionality, an accounting or human resources functionality, or the like. A software product may comprise hundreds or thousands of files that may include executable files, source code files, configuration files, script files, and data files, that are typically installed on one or more storage devices via a software installer designed to install the particular software product.

The environment 10 includes a storage device 24 that includes, for each of a plurality of software products used by the entity 22, information that identifies, for each of the plurality of software products, a mechanism that the verification controller may utilize to obtain software product version information about a software product that has been released by the vendor of the software product. In this embodiment, the mechanisms comprise individual uniform resource locators (URLs) 26-1-26-Z (generally, URLs 26) that identify, for each software product, a web page on a vendor computing device 28-1-28-N that the vendor updates when a new version of a software product is available. Other mechanisms, for example, may comprise information that identifies an application programming interface (API), such as, by way of non-limiting example, a REST API, that the verification controller 20 may invoke to obtain the software product version information. In other embodiments, one or more software product vendors may document a particular interface of the software product which, when invoked, returns to the invoker software product version information about software products that have been released by the vendor of the software product.

The verification controller 20 periodically, intermittently or upon some event, utilizes the URLs 26 to obtain software product version information about software products used by the entity 22. The software product version information may comprise, for example, a list of software versions of the particular software product, or may simply identify a most recent version of the particular software product. The storage device 24 maintains, for each of the URLs 26, corresponding entries 30-1-30-Z, which contain previous software product version information that identifies the most recent version of the software product previously identified by the web pages of the vendor computing devices 28-1-28-N. In some embodiments, the entries 30 contain a copy of the web page previously returned by the vendor computing devices 28-1-28-N when the verification controller 20 last requested the web page.

The verification controller 20 may then compare the software product version information contained in the web page returned by a vendor computing device 28 to the web page previously returned by the vendor computing device 28 to determine if a new version of the software product exists.

As an example of implementing rapid software product version detection and certification an example of processing implemented by the verification controller 20 is provided. The verification controller 20, in this example, periodically, such as every hour, eight hours, or daily, processes each of the URLs 26. For example, the verification controller 20 accesses the URL 26-1 that identifies a web page on the vendor computing device 28-1 that contains software product version information for a software product A. The verification controller 20 requests the web page from the vendor computing device 28-1. The verification controller 20 parses the web page and compares the textual contents of the web page to the contents of the entry 30-1 that contains the previous software product version information obtained from the vendor computing device 28-1. The verification controller 20 determines that the software product version information identifies a more recent version of the software product A.

The verification controller 20 then downloads the more recent version of the software product A as a software product A version 2 (AV2) 32. In some embodiments, the address for obtaining the more recent version of the software product AV2 may be contained in the software product version information obtained from the vendor computing device 28-1. In some embodiments, the verification controller 20 may maintain additional download information for each software product that identifies a location from which the respective software product can be downloaded.

The storage device 24 also maintains a plurality of test environment configuration files 34-1-34-Z (generally, test environment configuration files 34), each of which corresponds to a particular software product, and which identifies the particular testing environment via which the particular software product is to be tested. For example, the test environment configuration file 34-1 corresponds to the software product AV2 and identifies a quantity of computing hosts or virtual machines for a test computing environment, and for each respective computing host or virtual machine, a characteristic of the respective computing host or virtual machine. For example, the test environment configuration files 34-1 may indicate that six virtual machines (VM) will be needed to test the software product AV2, that each should be allocated 32 gigabytes of memory and allocated eight virtual CPUs. Table 1 below contains example characteristics of a suitable test environment that may be identified in a test environment configuration file 34 according to one embodiment.

TABLE 1

```
vsphere__datacenter = "Datacenter Pod"
vsphere__cluster   = "Cluster Pod"
vsphere__datastore   = "Datastore"
vsphere__network__id = "vlan1234"
vsphere__vm__template = "centos79"
vsphere__folder   = "vms"
vsphere__resource__pool = "ResourcePool"
hostname__prefix = "hostname123"
node__count   = 6
vcpus   = 8
memory   = 32768
disk__size__list = [150]
use__static__ip   = true
ipv4__subnet__mask = 24
ipv4__gateway   = "192.168.2.1"
ipv4__dns__list   = ["192.168.2.53"]
```

TABLE 1-continued

```
ipv4__list   = ["192.168.2.2", "192.168.2.3", "192.168.2.4",
"192.168.2.5"]
```

The verification controller 20 sends, to a dynamic computing environment 36 that is operable to establish computing hosts or virtual machines upon request, a request to establish the quantity of computing hosts or virtual machines identified in the test environment configuration file 34-1. The request includes, for each respective computing host or virtual machine, the characteristic of the respective computing host or virtual machine. The dynamic computing environment 36 may comprise, for example, a cloud computing environment, such as Amazon Web Services® (AWS) or the like that is operable to provide computing resources upon demand. In some embodiments, the entity 22 may maintain its own dynamic computing environment that is operable to establish computing hosts or virtual machines upon request.

In this example, the verification controller 20 requests that a test computing environment that includes a plurality of VMs be established. In response, the dynamic computing environment 36 establishes a test computing environment 37 that includes a plurality of VMs 38-1-38-P on a computing host 40. The dynamic computing environment 36 sends address information for each VM 38 to the verification controller 20 to facilitate communications by the verification controller 20 with each respective VM 38, or, the verification controller 20 may provide the address information for each VM 38, such as desired IP addresses, as part of the request to the dynamic computing environment 36.

The verification controller 20 causes the software product AV2 32 to be installed on the VMs 38. The storage device 24 maintains a plurality of test information 42-1-42-Z (generally, test information 42), each of which corresponds to a software product and which contains test inputs for testing the software product. The test information 42 may comprise, for example, a script of commands that may be processed by the verification controller 20. In this example the test information 42-1 corresponds to the software product AV2, and the verification controller 20 accesses the test information 42-1. The verification controller 20 causes a plurality of test inputs identified in the test information 42-1 to be sent to the software product AV2 installed on the VMs 38. The verification controller 20 receives responses from the software product AV2 installed on the VMs 38 in response to the plurality of test inputs.

The verification controller 20 analyzes the responses and compares the response to expected responses from the software product AV2. The verification controller 20 may then determine that the software product AV2 has passed a test threshold based on the responses or has failed the test threshold. The test threshold may differ depending on the particular software product. For some software products, the test threshold may indicate that any response that deviates from the expected response constitutes failing the test threshold. For other software products, the test thresholds may be in terms of performance rather than or in addition to output responses. For example, the test inputs may test a load capacity of the software product and the verification controller 20 may access computing resource metrics of the VMs 38 while the software product is processing the test inputs. The test threshold may designate that no more than a predetermined amount of processor utilization of the VMs 38 or memory utilization should occur in order to pass the test threshold.

In this example, the verification controller 20 determines that the software product AV2 passes the test threshold. In response, the verification controller 20 generates a copy 44 of the software product on a storage device 46 that comprises a plurality of certified software products available for implementation by the entity 22. The verification controller 20 also updates the entry 30-1 to contain the web page obtained from the vendor computing device 28-1.

In some embodiments, while testing the software product AV2, the verification controller 20 generates an electronic software product certification document 48 that identifies the plurality of test inputs and the responses from the software product AV2 that were generated in response to the plurality of test inputs. The electronic software product certification document 48 may comprise screen shots of the responses, and various metrics of the VMs 38 during the testing of the software product AV2. The verification controller 20 stores the electronic software product certification document 48 on a certification storage device 50 on which software products that have been certified for implementation are stored.

It is noted that, because the verification controller 20 is a component of the verification computing system 12, functionality implemented by the verification controller 20 may be attributed to the verification computing system 12 generally. Moreover, in examples where the verification controller 20 comprises software instructions that program the one or more processor devices 16 to carry out functionality discussed herein, functionality implemented by the verification controller 20 may be attributed herein to the one or more processor devices 16.

FIG. 2 is a flowchart of a method for implementing rapid software product version detection and certification according to one embodiment. FIG. 2 will be discussed in conjunction with FIG. 1. The verification computing system 12 obtains, from the vendor computing device 28-1, the software product version information that identifies a most recent version of a software product available from a software vendor of a plurality of different software vendors (FIG. 2, block 1000). The verification computing system 12 determines that an updated version of the software product is available that has not been tested by the verification computing system (FIG. 2, block 1002). The verification computing system 12 causes a generation of the test computing environment 37 that comprises the virtual machines 38 (FIG. 2, block 1004). The verification computing system 12 tests the updated version of the software product using the test computing environment 37 (FIG. 2, block 1006). The verification computing system 12 generates information that indicates that the updated version of the software product failed or passed a test threshold (FIG. 2, block 1008).

Figure 3A:
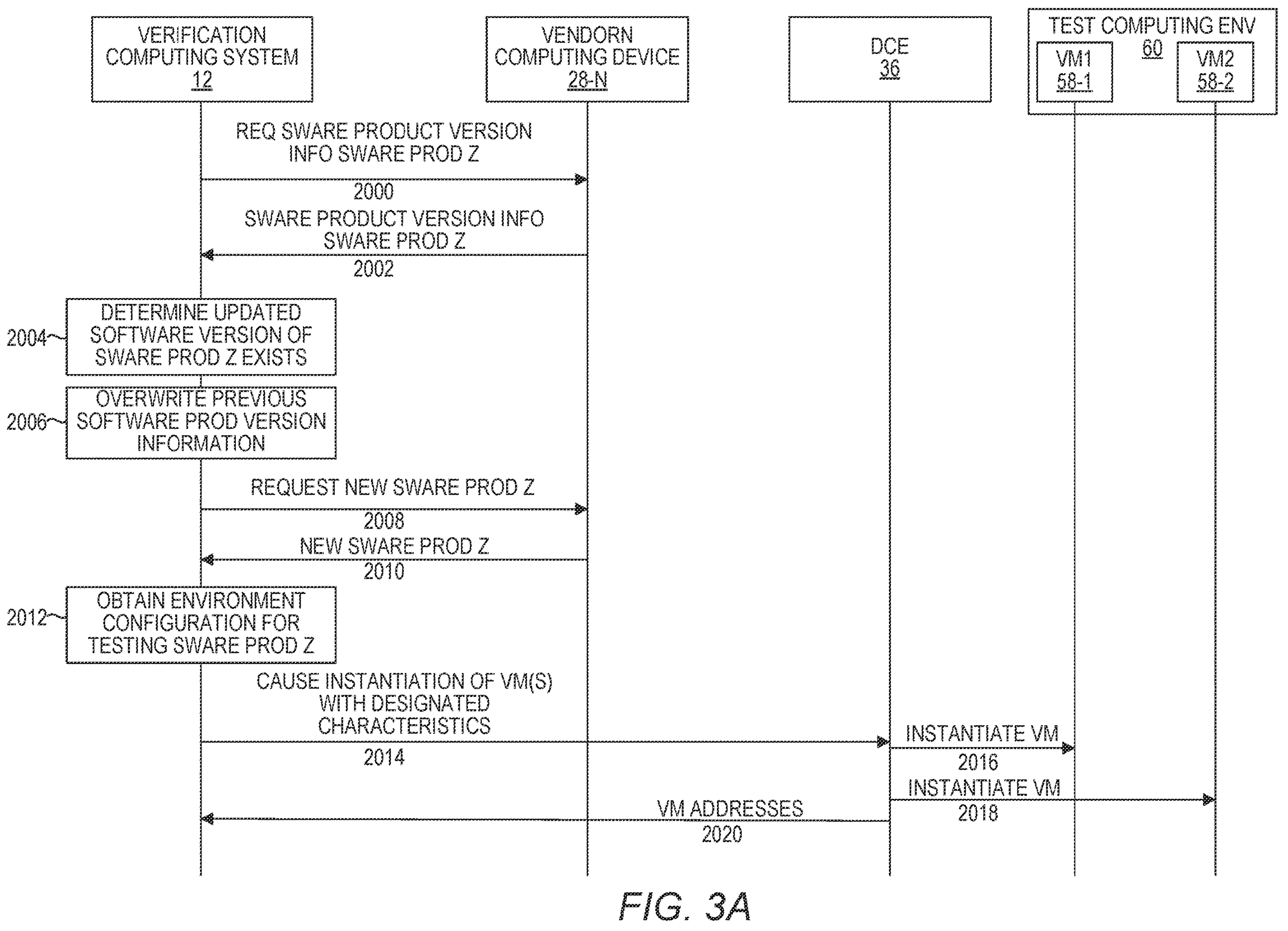
FIGS. 3A-3C are a message sequence diagram illustrating actions of and messages communicated between various components illustrated in FIG. 1 when implementing rapid software product version detection and certification according to one embodiment.
Figure 3B:
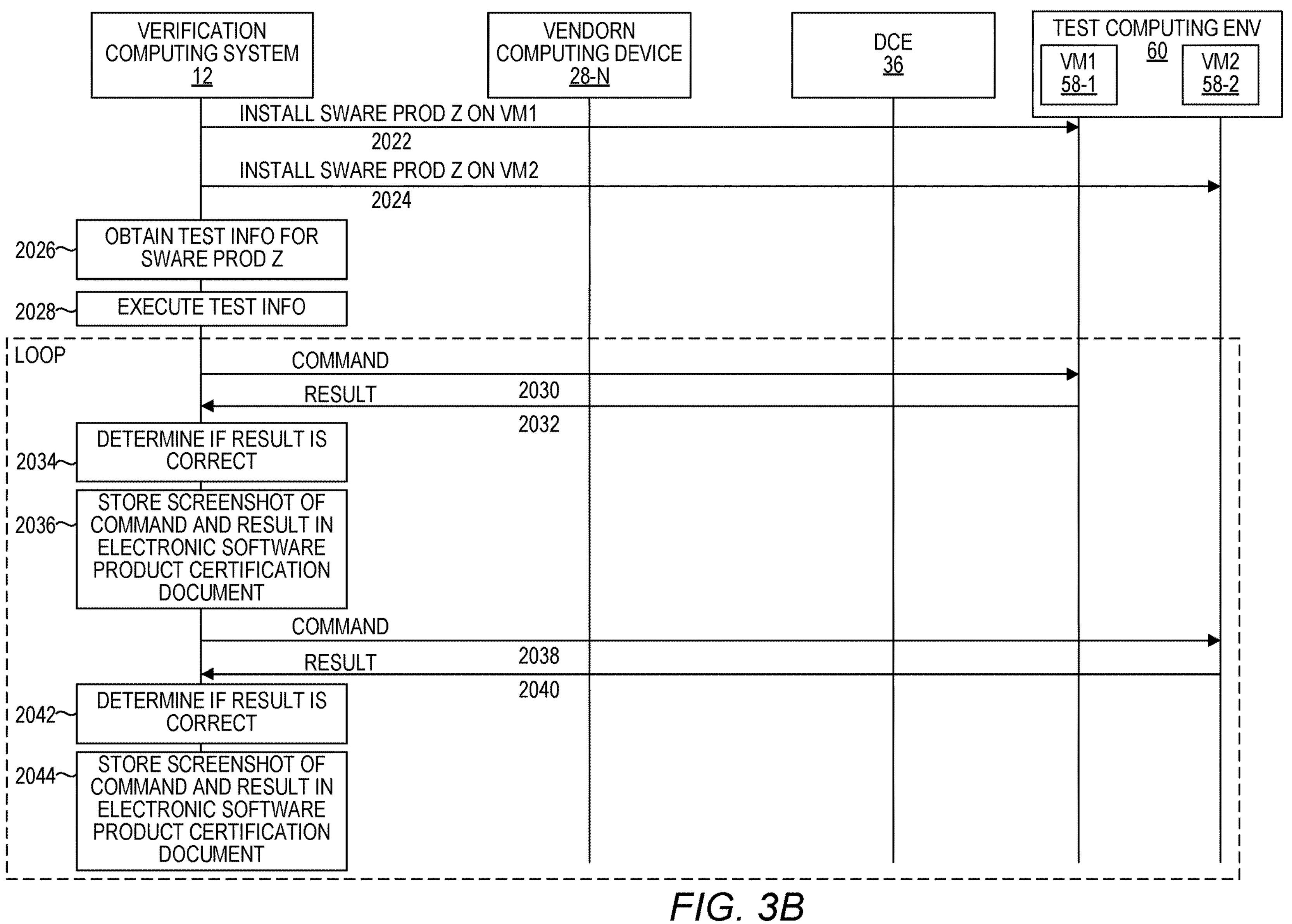
Figure 3C:
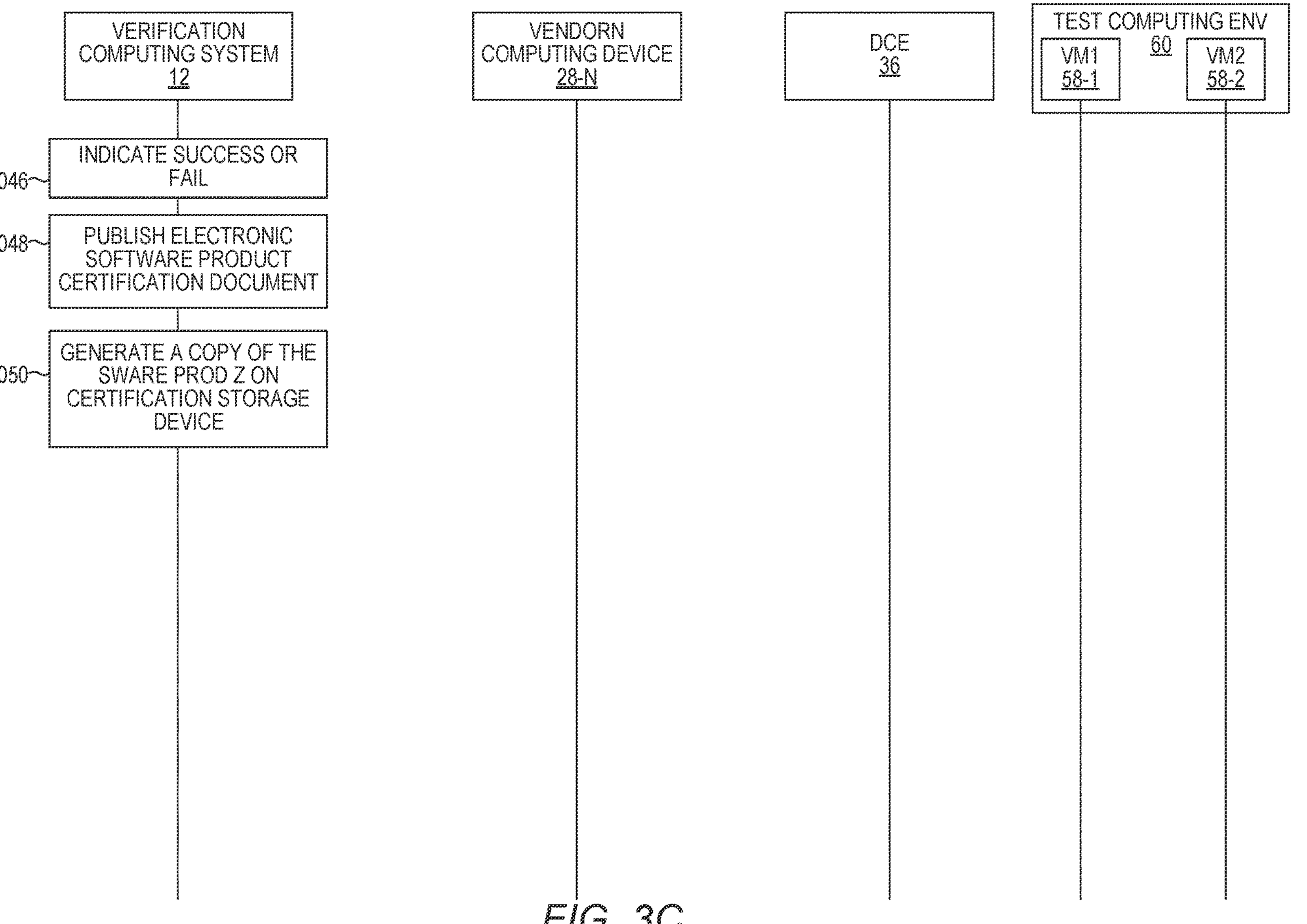

FIGS. 3A-3C illustrate a message sequence diagram illustrating actions of and messages communicated between various components illustrated in FIG. 1 when implementing rapid software product version detection and certification according to one embodiment. In this example, as part of the iterative processing of all the URLs 26, the verification computing system 12 accesses the URL 26-Z. Based on the URL 26-Z, the verification computing system 12 requests, from the vendor computing device 28-N, the software product version information corresponding to a software product Z (step 2000). The vendor computing device 28-N responds with the software product version information corresponding to the software product Z (step 2002). The verification computing system 12 accesses the entry 30-Z, which contains the previous software product version information that identifies the most recent version of the software product Z previously identified by the web page of the vendor computing device 28-N. The verification computing system 12 parses both the software product version information just received from the vendor computing device 28-N and that contained the entry 30-Z, and determines that a new version of the software product Z exists (step 2004). The verification computing system 12 overwrites the previous information in the entry 30-Z with the software product version information just received from the vendor computing device 28-N (step 2006).

The verification computing system 12 sends a request to the vendor computing device 28-N to obtain the new version of the software product Z (step 2008). The vendor computing device 28-N responds with the new version of the software product Z (step 2010).

The verification computing system 12 accesses the test environment configuration file 34-Z that identifies a quantity of computing hosts or virtual machines for a test computing environment suitable for testing the software product Z (step 2012). The test environment configuration file 34-Z also contains characteristics of the respective computing hosts or virtual machines. The verification computing system 12 sends to the dynamic computing environment 36 a request to establish two VMs that have certain characteristics (step 2014).

The dynamic computing environment 36 instantiates a VM 58-1 and a VM 58-2 that form a test computing environment 60 suitable for testing the software product Z (steps 2016, 2018). The dynamic computing environment 36 returns VM addresses of the VMs 58-1, 58-2 to the verification computing system 12 (step 2020).

Referring now to FIG. 3B, the verification computing system 12 installs the software product Z on the VMs 58-1, 58-2 (steps 2022, 2024). The verification computing system 12 accesses the test information 42-Z that corresponds to the software product Z (step 2026). In this example, the test information 42-Z is an executable script. The verification computing system 12 executes the script to cause a plurality of test inputs identified in the test information 42-Z to be sent to the updated version of the software product Z installed in the test computing environment 60 (steps 2028, 2030, 2038). The verification computing system 12 receives responses from the updated version of the software product Z generated in response to the plurality of test inputs (steps 2032, 2040). The verification computing system 12 determines if the responses are correct (steps 2034, 2042). The verification computing system 12 stores the test inputs and the results in an electronic software product certification document (steps 2036, 2044).

Referring now to FIG. 3C, the verification computing system 12 determines that the updated version of the software product Z passed the test threshold, and generates information that indicates that the software product Z has passed the test (step 2046). For example, the verification computing system 12 may send information to a display device indicating that the software product Z has passed the test, or may store the information in a file. The verification computing system 12 may also publish the electronic software product certification document (step 2048). The verification computing system 12 stores the software product Z on the certification storage device 50 on which software products that have been certified for implementation are stored (step 2050).

Figure 4:
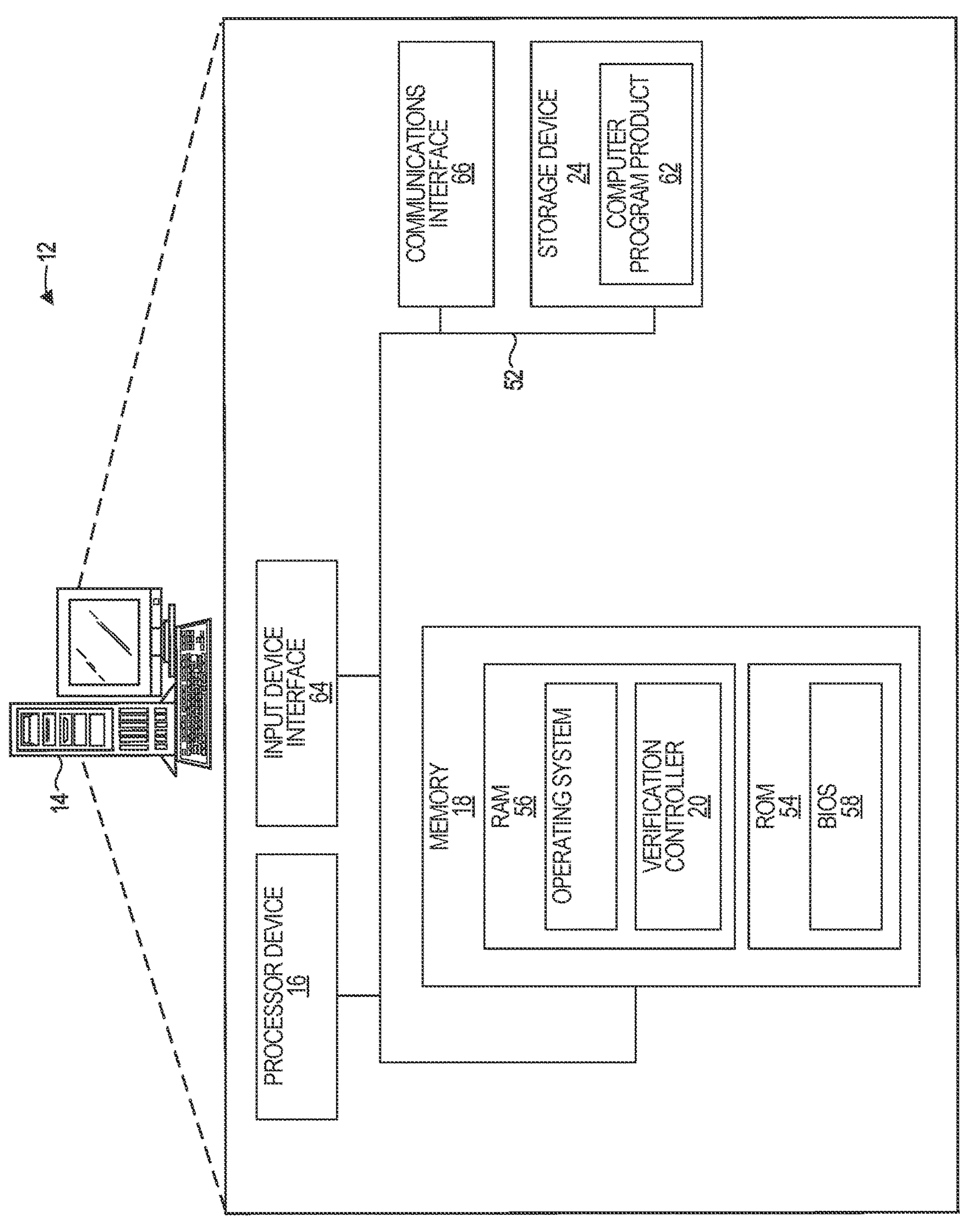
FIG. 4 is a block diagram of a verification computing system suitable for implementing rapid software product version detection and certification according to one embodiment.

FIG. 4 is a block diagram of the verification computing system 12 suitable for implementing examples according to one example. The verification computing system 12 may comprise one or more computing or electronic devices capable of including firmware, hardware, and/or executing software instructions to implement the functionality described herein, such as computer servers or the like. The verification computing system 12 includes at least one computing device 14, which in turn includes one or more processor devices 16, the system memory 18, and a system bus 52. The system bus 64 provides an interface for system components including, but not limited to, the system memory 18 and the processor device 16. The processor device 16 can be any commercially available or proprietary processor device.

The system bus 52 may be any of several types of bus structures that may further interconnect to a memory bus (with or without a memory controller), a peripheral bus, and/or a local bus using any of a variety of commercially available bus architectures. The system memory 18 may include non-volatile memory 54 (e.g., read-only memory (ROM), erasable programmable read-only memory (EPROM), electrically erasable programmable read-only memory (EEPROM), etc.), and volatile memory 56 (e.g., random-access memory (RAM)). A basic input/output system (BIOS) 58 may be stored in the non-volatile memory 54 and can include the basic routines that help to transfer information between elements within the verification computing system 12. The volatile memory 56 may also include a high-speed RAM, such as static RAM, for caching data.

The computing device 14 may further include or be coupled to a non-transitory computer-readable storage medium such as the storage device 24, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 24 and other drives associated with computer-readable media and computer-usable media may provide non-volatile storage of data, data structures, computer-executable instructions, and the like.

A number of modules can be stored in the storage device 24 and in the volatile memory 56, including an operating system and one or more program modules, such as the verification controller 20, which may implement the functionality described herein in whole or in part. All or a portion of the examples may be implemented as a computer program product 62 stored on a transitory or non-transitory computer-usable or computer-readable storage medium, such as the storage device 24, which includes complex programming instructions, such as complex computer-readable program code, to cause the processor device 16 to carry out the steps described herein. Thus, the computer-readable program code can comprise software instructions for implementing the functionality of the examples described herein when executed on the processor device 16. The processor device 16, in conjunction with the verification controller 20 in the volatile memory 56, may serve as a controller, or control system, for the verification computing system 12 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 16 through an input device interface 64 that is coupled to the system bus 52 but can be connected by other interfaces such as a parallel port, an Institute of Electrical and Electronic Engineers (IEEE) 1394 serial port, a Universal Serial Bus (USB) port, an IR interface, and the like. The computing device 14 may also include a communications interface 66 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:

obtaining, by a verification computing system from a first vendor computing device, software product version information that identifies a most recent version of a first software product available from a first software vendor of a plurality of different software vendors;

determining, by the verification computing system, that an updated version of the first software product is available that has not been tested by the verification computing system, wherein determining that the updated version of the first software product is available that has not been tested by the verification computing system comprises:

determining a Uniform Resource Locator (URL) that corresponds to the first software product;

requesting a web page addressed by the URL;

parsing the web page to identify the most recent version of the first software product available from the first software vendor;

accessing, by the verification computing system, previous software product version information that identifies a most recent version of the first software product that has been tested by the verification computing system; and determining, by the verification computing system, that the most recent version of the first software product available from the first software vendor is a more recent version of the first software product than the most recent version of the first software product that has been tested by the verification computing system;

causing, by the verification computing system, a generation of a first test computing environment that comprises one or more computing hosts or virtual machines;

testing, by the verification computing system, the updated version of the first software product using the first test computing environment, wherein testing the updated version of the first software product comprises:

accessing test information that corresponds to the first software product;

causing, by the verification computing system, a plurality of test inputs identified in the test information to be sent to the updated version of the first software product;

generating, by the verification computing system, information that comprises a plurality of screen shots of responses generated in response to the plurality of test inputs; and storing the test inputs and the information in a file;

based on the test inputs and the responses, determining, by the verification computing system, that the updated version of the first software product passed the test threshold;

in response to determining that the updated version of the first software product passed the test threshold, generating, by the verification computing system, an electronic software product certification document that identifies the plurality of test inputs and the responses from the updated version of the first software product generated in response to the plurality of test inputs; and storing, by the verification computing system on a storage device, the electronic software product certification document.

2. The method of claim 1 further comprising:

in response to determining that the updated version of the first software product passed the test threshold, modifying the software product version information to indicate that the updated version of the first software product is the most recent version of the first software product that has been tested by the verification computing system.

3. The method of claim 1 wherein causing, by the verification computing system, the generation of the first test computing environment that comprises one or more computing hosts or virtual machines comprises:

accessing, by the verification computing system, a test environment configuration file that identifies a quantity of computing hosts or virtual machines for the first test computing environment, and for each respective computing host or virtual machine, a characteristic of the respective computing host or virtual machine; and sending, by the verification computing system to a dynamic computing environment operable to establish computing hosts or virtual machines upon requests, a request to establish the quantity of computing hosts or virtual machines, the request including, for each respective computing host or virtual machine, the characteristic of the respective computing host or virtual machine.

4. The method of claim 3 further comprising:

receiving, by the verification computing system from the dynamic computing environment, address information for each respective computing host or virtual machine to facilitate communications by the verification computing system with each respective computing host or virtual machine.

5. The method of claim 4 further comprising causing, by the verification computing system, the updated version of the first software product to be installed on each respective computing host or virtual machine.

6. The method of claim 1 further comprising:

in response to determining that the updated version of the first software product passed the test threshold, generating, by the verification computing system, a copy of the first software product on a storage device that comprises a plurality of certified software products available for implementation.

7. The method of claim 1 further comprising downloading, by the verification computing system, the updated version of the first software product.

8. The method of claim 1 further comprising:

obtaining, by the verification computing system from a second vendor computing device, software product version information that identifies a most recent version of a second software product available from a second software vendor of the plurality of different software vendors;

determining, by the verification computing system, that an updated version of the second software product is available that has not been tested by the verification computing system;

downloading, by the verification computing system, the updated version of the second software product;

causing, by the verification computing system, a generation of a second test computing environment that comprises one or more computing hosts or virtual machines;

testing, by the verification computing system, the updated version of the second software product using the second test computing environment; and generating, by the verification computing system, second software product certification results that indicate that the updated version of the second software product failed or passed a test threshold.

9. A computing system comprising:

one or more computing devices configured to:

obtain, from a first vendor computing device, software product version information that identifies a most recent version of a first software product available from a first software vendor of a plurality of different software vendors;

determine that an updated version of the first software product is available that has not been tested by the computing system, wherein to determine that the updated version of the first software product is available that has not been tested by the verification computing system, the one or more computing devices are further configured to:

determine a Uniform Resource Locator (URL) that corresponds to the first software product;

request a web page addressed by the URL;

parse the web page to identify the most recent version of the first software product available from the first software vendor;

access, by the verification computing system, previous software product version information that identifies a most recent version of the first software product that has been tested by the verification computing system; and determine, by the verification computing system, that the most recent version of the first software product available from the first software vendor is a more recent version of the first software product than the most recent version of the first software product that has been tested by the verification computing system;

cause a generation of a first test computing environment that comprises one or more computing hosts or virtual machines;

test the updated version of the first software product using the first test computing environment, wherein to test the updated version of the first software product, the one or more computing devices are further configured to:

access test information that corresponds to the first software product;

cause, by the verification computing system, a plurality of test inputs identified in the test information to be sent to the updated version of the first software product;

generate information that comprises a plurality of screen shots of responses generated in response to the plurality of test inputs; and store the test inputs and the information in a file;

based on the test inputs and the responses, determine that the updated version of the first software product passed the test threshold;

in response to determining that the updated version of the first software product passed the test threshold, generate an electronic software product certification document that identifies the plurality of test inputs and the responses from the updated version of the first software product generated in response to the plurality of test inputs; and store on a storage device, the electronic software product certification document.

10. The computing system of claim 9 wherein to cause the generation of the first test computing environment that comprises one or more computing hosts or virtual machines, the one or more computing devices are further configured to:

access a test environment configuration file that identifies a quantity of computing hosts or virtual machines for the first test computing environment, and for each respective computing host or virtual machine, a characteristic of the respective computing host or virtual machine; and send, to a dynamic computing environment operable to establish computing hosts or virtual machines upon requests, a request to establish the quantity of computing hosts or virtual machines, the request including, for each respective computing host or virtual machine, the characteristic of the respective computing host or virtual machine.

11. A non-transitory computer-readable storage medium that includes executable instructions configured to cause a computing system to:

obtain, from a first vendor computing device, software product version information that identifies a most recent version of a first software product available from a first software vendor of a plurality of different software vendors;

determine that an updated version of the first software product is available that has not been tested by the computing system, wherein to determine that the updated version of the first software product is available that has not been tested by the verification computing system, the instructions are further configured to cause the computing system to:

determine a Uniform Resource Locator (URL) that corresponds to the first software product;

request a web page addressed by the URL;

parse the web page to identify the most recent version of the first software product available from the first software vendor;

access, by the verification computing system, previous software product version information that identifies a most recent version of the first software product that has been tested by the verification computing system; and determine, by the verification computing system, that the most recent version of the first software product available from the first software vendor is a more recent version of the first software product than the most recent version of the first software product that has been tested by the verification computing system;

cause a generation of a first test computing environment that comprises one or more computing hosts or virtual machines;

test the updated version of the first software product using the first test computing environment, wherein to test the updated version of the first software product, the instructions are further configured to cause the computing system to:

access test information that corresponds to the first software product;

cause, by the verification computing system, a plurality of test inputs identified in the test information to be sent to the updated version of the first software product;

generate information that comprises a plurality of screen shots of responses generated in response to the plurality of test inputs; and store the test inputs and the information in a file;

based on the test inputs and the responses, determine that the updated version of the first software product passed the test threshold;

in response to determining that the updated version of the first software product passed the test threshold, generate an electronic software product certification document that identifies the plurality of test inputs and the responses from the updated version of the first software product generated in response to the plurality of test inputs; and store on a storage device, the electronic software product certification document.

12. The non-transitory computer-readable storage medium of claim 11 wherein to cause the generation of the first test computing environment that comprises one or more computing hosts or virtual machines, the instructions are further configured to cause the computing system to:

access a test environment configuration file that identifies a quantity of computing hosts or virtual machines for the first test computing environment, and for each respective computing host or virtual machine, a characteristic of the respective computing host or virtual machine; and send, to a dynamic computing environment operable to establish computing hosts or virtual machines upon requests, a request to establish the quantity of computing hosts or virtual machines, the request including, for each respective computing host or virtual machine, the characteristic of the respective computing host or virtual machine.

* * * * *